(12) United States Patent
Dame et al.

(10) Patent No.: US 10,336,266 B2
(45) Date of Patent: Jul. 2, 2019

(54) INTERIOR FLANGE FOR SLIDE-ROOM

(71) Applicant: Composite Solutions, Inc., Eugene, OR (US)

(72) Inventors: Dennis Dame, Harrisburg, OR (US); Jeffrey Chase, Eugene, OR (US); Stefan Crabtree, Coburg, OR (US)

(73) Assignee: Composite Solutions, Inc., Eugene, OR (US)

( * ) Notice: Subject to any disclaimer, the term of this patent is extended or adjusted under 35 U.S.C. 154(b) by 0 days.

(21) Appl. No.: 15/638,252

(22) Filed: Jun. 29, 2017

(65) Prior Publication Data

US 2018/0001842 A1    Jan. 4, 2018

Related U.S. Application Data

(60) Provisional application No. 62/357,152, filed on Jun. 30, 2016.

(51) Int. Cl.
| | |
|---|---|
| *E04B 1/346* | (2006.01) |
| *B60P 3/34* | (2006.01) |
| *B60R 13/06* | (2006.01) |
| *E04B 7/16* | (2006.01) |

(52) U.S. Cl.
CPC .............. *B60R 13/06* (2013.01); *B60P 3/341* (2013.01); *E04B 1/346* (2013.01); *E04B 7/166* (2013.01)

(58) Field of Classification Search
CPC . E04B 1/6815; B60P 3/34; B60J 10/36; B60J 10/86; B60R 13/06; E06B 7/2301; E06B 7/2305

USPC ..................... 52/718.05, 716.6, 96
See application file for complete search history.

(56) References Cited

U.S. PATENT DOCUMENTS

| | | | | |
|---|---|---|---|---|
| 2,744,781 | A * | 5/1956 | Black .......................... | B60P 3/34 296/171 |
| 3,093,931 | A * | 6/1963 | Waring ..................... | E04D 13/15 52/96 |
| 3,242,537 | A * | 3/1966 | Monti ..................... | F25D 23/087 49/402 |
| 4,666,206 | A * | 5/1987 | Hough ................. | B60R 13/0206 296/216.07 |
| 4,916,864 | A * | 4/1990 | Thompson ............ | E06B 7/2305 49/478.1 |
| 5,237,782 | A * | 8/1993 | Cooper ..................... | B60P 3/34 296/171 |

(Continued)

*Primary Examiner* — Christine T Cajilig
(74) *Attorney, Agent, or Firm* — Klarquist Sparkman, LLP

(57) ABSTRACT

An assembly for sealing a space between a secondary structure movable into and out of a primary structure includes a base member mountable to an outer surface of the secondary structure and a flange member. The flange member includes a main flange portion and a coupling portion extending from the main flange portion. The main flange portion includes a first portion and a second portion. The second portion is on the opposite side of the coupling portion from the first portion. The coupling portion is couplable to the base member such that the first portion is adjacent a rear wall of the secondary structure and the second portion extends beyond the outer surface of the secondary structure when the coupling portion is coupled to the base member. The second portion is configured to engage an interior surface of the primary structure when the secondary structure is in the extended position.

21 Claims, 5 Drawing Sheets

(56) References Cited

U.S. PATENT DOCUMENTS

| | | | |
|---|---|---|---|
| 6,176,045 B1* | 1/2001 | McManus | B60P 3/34 296/26.09 |
| 2004/0094906 A1 | 5/2004 | Gentemann et al. | |
| 2007/0194586 A1 | 8/2007 | Gardner | |
| 2012/0110924 A1* | 5/2012 | Makin | E04D 13/1478 52/58 |
| 2013/0269262 A1* | 10/2013 | Siegel | B60R 13/08 49/492.1 |
| 2015/0158438 A1* | 6/2015 | Ksiezopolski | B60P 3/34 277/638 |
| 2016/0114715 A1 | 4/2016 | Newhouse | |
| 2018/0043844 A1* | 2/2018 | Ksiezopolski | F16J 15/027 |
| 2018/0236951 A1* | 8/2018 | Newman | B62D 25/24 |

* cited by examiner

INTERIOR FLANGE FOR SLIDE-ROOM

CROSS REFERENCE TO RELATED APPLICATION

This application claims the benefit of U.S. Provisional Application 62/357,152, filed Jun. 30, 2016, which is incorporated herein by reference.

FIELD

The present application relates to a flange and seal assembly that can be installed, for example, on a slide-room of a vehicle.

BACKGROUND

In vehicles or structures including slide-rooms, a flange assembly can be secured to the rear wall and/or roof of the slide-room that seals against the interior surface of the wall of the vehicle when the slide-room is in the extended position. However, such assemblies typically must be installed after the slide-room has been situated in the vehicle. The flange assemblies are typically secured using fasteners placed horizontally through the rear wall of the slide-room. However, due to limited space between the roof of the slide-room and the ceiling of the vehicle, it can be difficult or impossible to secure portions of the flange assembly disposed on the roof of the slide-room. The horizontally-oriented fasteners do not hold the flange assembly tightly against the interior wall of the vehicle, which can result in leakage past the flange into the interior of the vehicle. Additionally, the unsecured portions of the flange assembly disposed on the roof of the slide-room can be prone to movement or lifting when the flange assembly engages the interior wall of the vehicle, further contributing to leakage past the flange assembly. Thus, improvements to flange assemblies for slide-rooms are desirable.

SUMMARY

Certain embodiments of the disclosure concern flange assemblies for slide-rooms and methods of installing the same. In a representative embodiment, an assembly for sealing a space between a secondary structure movable into and out of an opening in a wall of a primary structure between an extended position and a retracted position comprises a base member mountable to an outer surface of the secondary structure and a flange member. The flange member includes a main flange portion and a coupling portion extending from the main flange portion. The main flange portion includes a first portion and a second portion. The second portion is on the opposite side of the coupling portion from the first portion. The coupling portion is couplable to the base member such that the first portion is adjacent a rear wall of the secondary structure and the second portion extends beyond the outer surface of the secondary structure when the coupling portion is coupled to the base member. The second portion of the main flange portion is configured to engage an interior surface of the wall of the primary structure when the secondary structure is in the extended position.

In another representative embodiment, a method comprises mounting a base member on an outer surface of a secondary structure, and installing the secondary structure in an opening defined in a wall of a primary structure such that the secondary structure is movable through the opening between an extended position and a retracted position. The method further comprises coupling a flange member to the base member with a coupling portion of the flange member. The flange member includes a main flange portion from which the coupling portion extends. The main flange portion further including a first portion and a second portion, and the second portion is on the opposite side of the coupling portion from the first portion. The flange member is coupled to the base member such that the first portion of the main flange portion is adjacent a rear wall of the secondary structure, and such that the second portion of the main flange portion extends beyond the outer surface of the secondary structure.

In another representative embodiment, a vehicle comprises a vehicle wall having an opening, and a slide-room mounted within the opening and being moveable relative to the wall between an extended position and a retracted position. The vehicle further comprises a flange assembly for sealing a space between the slide-room and the wall. The flange assembly comprises a base member mountable to an outer surface of the slide-room, and a flange member including a main flange portion and a coupling portion extending from the main flange portion. The main flange portion includes a first portion and a second portion. The second portion is on the opposite side of the coupling portion from the first portion. The coupling portion is coupled to the base member such that the first portion is adjacent a rear wall of the slide-room and the second portion extends beyond the outer surface of the slide-room. The second portion of the main flange portion is configured to engage an interior surface of the wall of the vehicle when the slide-room is in the extended position.

The foregoing and other objects, features, and advantages of the disclosed technology will become more apparent from the following detailed description, which proceeds with reference to the accompanying figures.

DETAILED DESCRIPTION

The present disclosure concerns embodiments of flange assemblies that can be installed on a secondary structure, such as a slide-room (also referred to as a slide-out room), disposed in a wall of a primary structure, such as a vehicle. As used herein, the term "vehicle" refers generally to any vehicle that has a power source (e.g., motor or engine) or a towable vehicle that is coupled to a driven vehicle for travelling from place to place. A vehicle can include, without limitation, a tractor-trailer, a folding camping trailer, a truck camper, a conventional travel trailer, a fifth wheel travel trailer, a sport utility recreational vehicle, a motorhome (e.g., class A, B, and C motorhomes), a horse trailer, a military trailer, or a utility trailer, to name a few. The embodiments of flange assemblies disclosed herein can also be installed in less mobile structures, such as mobile homes, house boats, mobile offices or command centers. If desired, the flange assemblies can be installed in permanent structures, such as houses, stores, etc.

Figure 1:
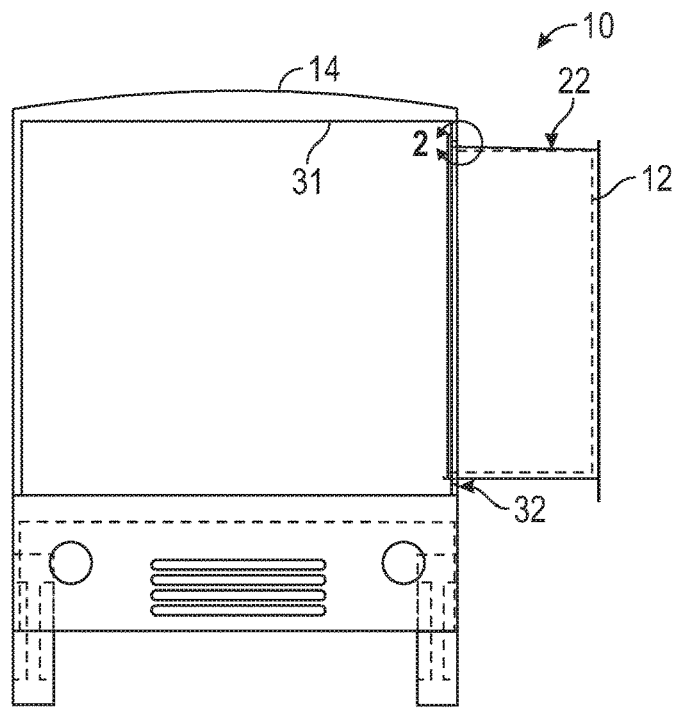
FIG. 1 illustrates a prior art flange assembly installed on a slide-room of a vehicle.
Figure 2:
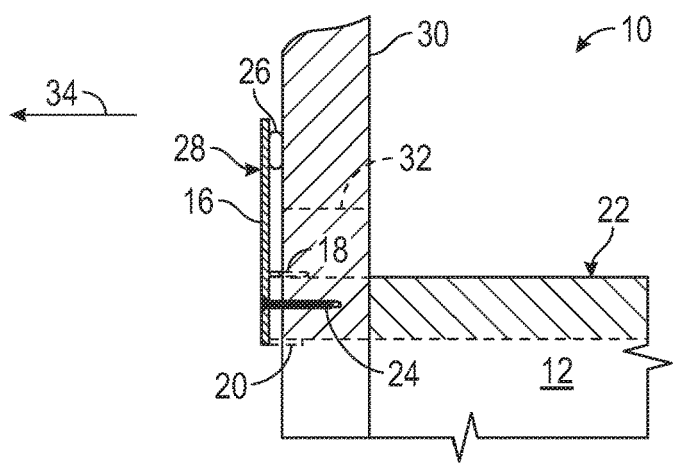
FIG. 2 is a detail view of portion 2 indicated in FIG. 1.

FIGS. 1 and 2 illustrate a prior art flange assembly 10 mounted to a secondary structure configured as a slide-room 12 installed in a side wall of a primary structure configured as a vehicle 14 (e.g., a recreational vehicle such as a motorhome). The slide-room 12 can be disposed in an opening 32 in the side wall of the vehicle and can be movable between an extended position (FIG. 1) and a retracted position.

Referring to FIG. 2, the flange assembly 10 includes a flange member 16 including first and second extension portions 18, 20 at one end arranged in an "F channel" configuration. The first and second extension portions 18, 20 can extend over, for example, respective upper and lower surfaces of a roof panel 22 of the slide-room 12. One or more fasteners such as screws 24 can extend horizontally into the roof panel 22 between the extension portions 18, 20 to secure the flange member 16 to the slide-room 12. A seal member 26 can be disposed on an upper portion 28 of the flange member 16 facing an interior surface of a wall 30 of the vehicle such that the seal member 26 can engage the interior surface of the wall when the slide-room 12 is in the extended position.

The prior art flange assembly of FIGS. 1 and 2 presents a number of drawbacks, including that the horizontally disposed screws 24 cannot adequately support the upper portion 28 of the flange member 16, allowing the flange member to deflect inwardly toward the center of the vehicle in the direction of arrow 34 when the seal 26 contacts the wall 30 when the slide-room is in the extended position. This reduces the compressive force applied to the seal member 26 by the flange member 16 and the wall 30, which can lead to leakage inside the vehicle. Additionally, due to the length of the flange member 16, the assembly typically must be installed on the slide-room after the slide-room is situated in the vehicle. As a result, it can be difficult or impossible to secure the extension portion 18 to the slide-room (e.g., with fasteners, etc.) because of the narrow clearance between the roof panel 22 of the slide-room and the ceiling 31 of the vehicle interior, and because access to the extension portion 18 is blocked by the flange 16. Thus, the extension portion 18 can also be prone to movement when the flange member 16 engages the wall 30. For example, the extension portion 18 can lift away from the roof panel 22 of the slide-room, potentially compromising the seal between the extension portion 18 and the roof panel 22.

Figure 3:
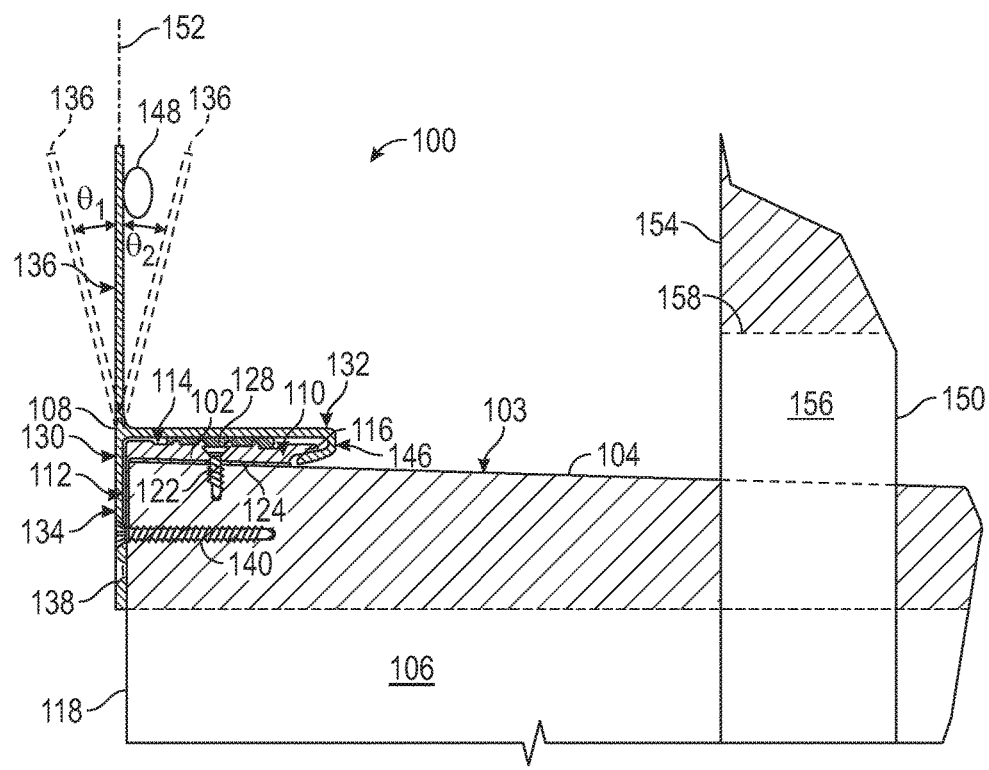
FIG. 3 is a side elevation view of a representative embodiment of a flange assembly installed on slide-room.
Figure 4:
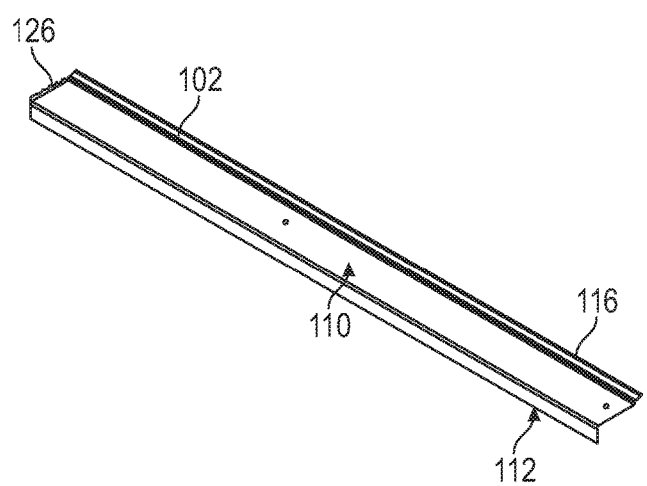
FIG. 4 is a perspective view of a mounting member of the flange assembly of FIG. 3.
Figure 5:
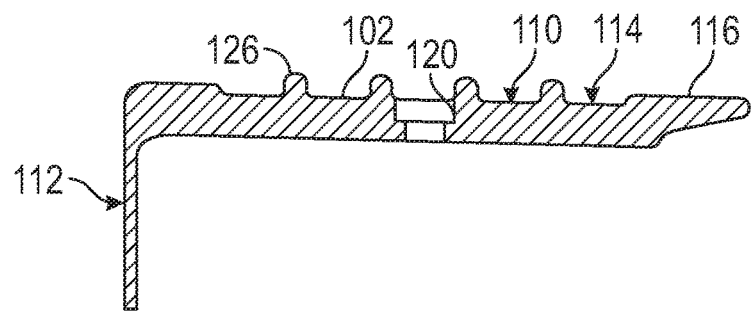
FIG. 5 is a profile view of the mounting member of FIG. 4.

FIGS. 3-9 illustrate an embodiment of a flange assembly 100 that addresses the drawbacks of the prior art flange assembly of FIGS. 1 and 2 above. The flange assembly 100 includes a base member 102 that mounts to an upper surface 103 of a roof panel 104 of a slide-room 106. The flange assembly also includes a flange member 108 that can be coupled to the base member 102. Referring to FIGS. 3-5, the base member 102 can include a main portion 110 and an extension portion 112. The extension portion 112 can extend downwardly from an edge of the main portion 110 (e.g., in a direction perpendicular to a surface 114 of the main portion) in the manner of an L-channel or, stated differently, such that the base member has an L-shaped cross-section. The base member 102 can further include a lip portion 116 extending lengthwise along the base member and forming an edge of the main portion 110 opposite the extension portion 112.

Referring to FIG. 3, the base member 102 can be positioned on the roof 104 of the slide-room 106 at the rear edge of the roof panel such that the extension portion 112 is disposed against or adjacent a rear surface of the roof panel 104, and/or against a surface of a rear wall 118 of the slide-room 106 (e.g., a surface oriented toward the interior of the vehicle). The base member 102 can define one or more openings 120 (FIG. 5) along its length configured to receive fasteners 122 (e.g., screws, bolts, or nails) oriented perpendicular to the roof panel 104 in order to secure the base member to the roof of the slide-room. In some embodiments, a seal member 124 can be disposed between the lower surface of the base member 102 and the surface of the roof panel 104. The seal member 124 can be compressed by the base member 102 when the fasteners 122 are tightened, as shown in FIG. 3.

In the embodiment of FIGS. 3-5, the surface 114 of the main portion 110 of the base member can be textured. For example, the surface 114 can include a plurality of ridges 126. The ridges 126 can extend along the length of the base member 102, or any suitable portion thereof, and can be configured to engage a seal member 128 disposed between the base member and the flange member 108, as described in greater detail below. In alternative embodiments, the base member 102 can include any suitable texturing at any suitable location, including no texturing (e.g., the surface 114 can be smooth), as desired.

Figure 6:
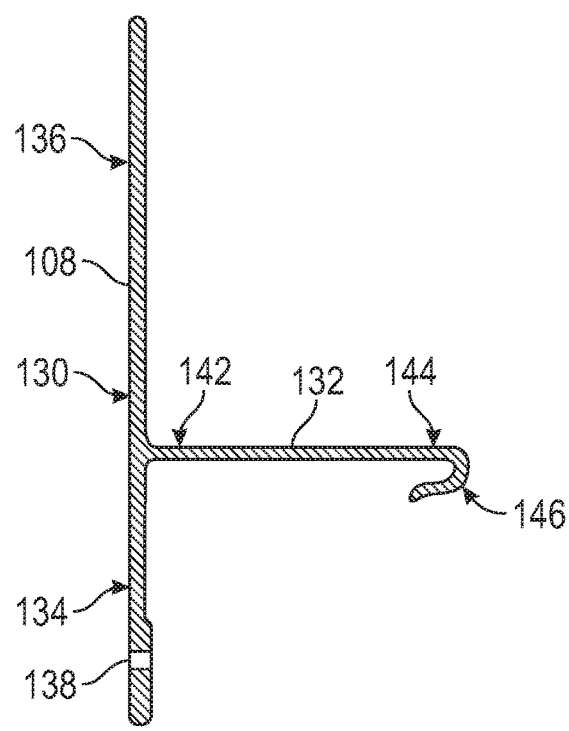
FIG. 6 is a profile view of a flange member of the flange assembly of FIG. 3.
Figure 7:
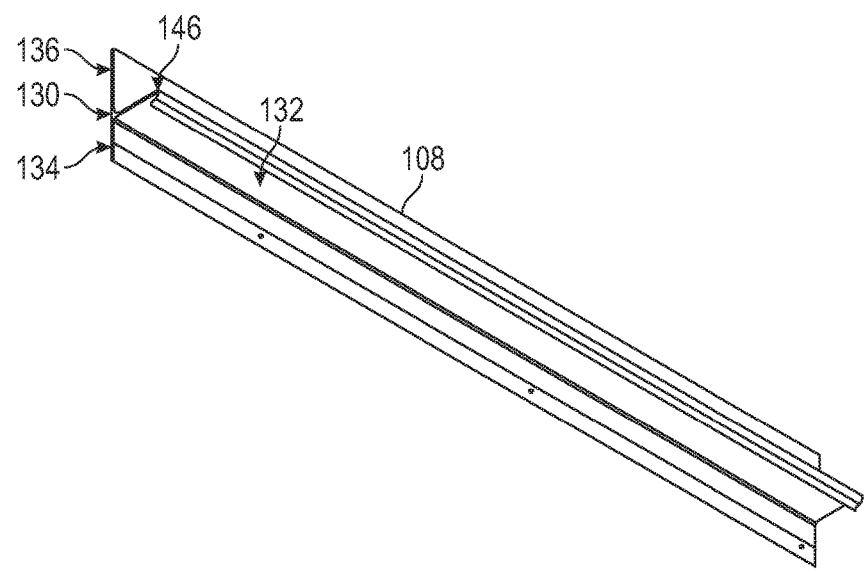
FIG. 7 is a perspective view of the flange member of FIG. 6.

Referring to FIGS. 3 and 6-7, the flange member 108 can include a main portion 130 and a coupling portion 132 configured to engage the base member 102. The main portion 130 can further include a first portion 134 (referred to herein in certain embodiments as a "mounting portion") and a second portion 136 (referred to herein in certain embodiments as a "sealing portion" or a "stop member"). In the illustrated embodiment, the main flange portion 130 is configured such that the sealing portion 136 is on the opposite side of the coupling portion 132 from the mounting portion 134. When installed on the slide-room, the mounting portion 134 can be located adjacent the rear or innermost wall 118 of the slide-room. In the illustrated embodiment, the mounting portion 134 can at least partially overlap the extension portion 112 of the base member 102, as shown in FIG. 3. The mounting portion 134 can define one or more openings 138 configured to receive fasteners 140 (e.g., screws, bolts, or nails) oriented perpendicular to the rear wall 118 of the slide-room to secure the flange member 108 to the rear wall of the slide-room and/or to the roof panel 104.

Referring to FIG. 6, coupling portion 132 can extend from the main portion 130 at a right angle such that the flange member 108 has a T-shaped cross-section. A first end portion 142 of the coupling portion 132 can be coupled to the main portion 130 of the flange member. In some embodiments, the first end portion 142 can be integrally-formed with the main portion 130 such that the flange member is a one-piece unitary construction. As used herein, the terms "unitary construction" and "integrally formed" refer to a construction that does not include any welds, fasteners, or other means for securing separately formed pieces of material to each other. Alternatively, the main portion 130 and the coupling portion 132 can be separately formed and secured to one another using fasteners, adhesives, etc.

A second end portion 144 of the coupling portion 132 can define a hook portion 146. The hook portion 146 can be configured to engage the lip portion 116 of the base member 102, as shown in FIG. 3. In this manner, the flange member 108 can be supported at its lower end by the mounting portion 134 secured to the rear wall 118 of the slide-room, and supported along a mid-section of its length by the coupling portion 132 coupled to the base member 102. When the hook portion 146 is engaged with the lip portion 116, the coupling portion 132 can also compress the seal member 128 to seal the space between the base member 102 and the coupling portion 132.

Referring again to FIG. 3, the sealing portion 136 can extend beyond the upper surface 103 of the slide-room (upwardly in the illustrated embodiment) when the assembly is installed. The sealing portion 136 can be oriented perpendicular to the surface 114 of the base member 102, and/or perpendicular to the upper surface 103 of the slide-room. In certain embodiments, the sealing portion 136 can also be oriented at an angle relative to the surface 114 and/or relative to the surface 103, as described further below.

In certain configurations, the sealing portion 136 can be configured to engage an interior surface 154 of a wall 150 of the vehicle when the slide-room 106 is in the extended position. In this manner, the sealing portion 136 of the flange member 108 can seal or cover the space 156 between the wall 150 and the slide-room 106. The flange member 108 can also stabilize the slide-room 106 in the extended position and prevent further outward movement of the slide-room relative to the vehicle so that, for example, the slide-room does not fall out of the vehicle. In this manner, the second portion 136 of the flange member 108 serves as a stop member that limits outward movement of the slide-room. Because the flange member 108 is supported at both the mounting portion 134 and the coupling portion 132, deflection of the sealing portion 136 can be reduced when the sealing portion 136 contacts the wall 150 of the vehicle, improving the seal therebetween. As illustrated in FIG. 3, in certain examples the sealing portion 136 can also include a seal member 148 (e.g., a bulb seal) mounted thereto and configured to engage the interior surface 154 of the wall 150 when the slide-room is in the extended position.

As stated above, in some examples the sealing portion 136 can be angled relative to the upper surface 103 of the slide-room and/or relative to the mounting portion 134 of the flange member 108. For example, with reference to FIG. 3, in some embodiments the sealing portion 136 can be angled inwardly (e.g., toward the interior of the vehicle) by an angle $\theta_1$ with respect to a vertical axis 152 defined by, for example, the rear wall 118 of the slide-room. In other embodiments, the sealing portion 136 can be angled outwardly (e.g., toward the sidewall 150 of the vehicle) by an angle $\theta_2$ with respect to the vertical axis 152. The sealing portion 136 can be angled inwardly, for example, in configurations where the wall 150 (or a portion of the wall 150) adjacent the opening 158 is also angled inwardly. This can allow the sealing portion 136 to engage such an angled sidewall without flexing excessively or breaking.

The sealing portion 136 can be angled outwardly, for example, in embodiments in which the sealing portion is configured to apply a force or preload to the wall 150 as the slide-room 106 approaches the extended position. This can be useful in configurations in which the floor of the slide-room is located above the floor of the vehicle when the slide-room is in the retracted position, and leverage is required in order to lower the slide-room such that the slide-room floor and the vehicle floor are at the same height when the slide-room reaches the extended position.

The angle $\theta_1$ can be selected according to, for example, a corresponding angle of the interior surface of the wall 150. The angle $\theta_2$ can be selected according to, for example, a selected force or preload to be applied to the wall 150 by the flange member 108 when the slide-room is in the extended position, or as the slide-room approaches the extended position. In certain examples, the angle $\theta_1$ can be from 1 degree to 30 degrees. In certain examples, the angle $\theta_1$ can be from 5 degrees to 20 degrees, or from 5 degrees to 10 degrees. In certain examples, the angle $\theta_2$ can be from 1 degree to 30 degrees, from 5 degrees to 20 degrees, or from 5 degrees to 10 degrees. In other examples, the sealing portion 136 can form a 90 degree angle with the upper surface 103 of the slide-room 106, and/or with the surface 114 of the base member 102. The sealing portion 136 can also be parallel to the rear wall 118. Additionally, although the angled configurations of the sealing portion 136 are shown without the seal member 148 for purposes of illustration, the sealing portion 136 can include such a seal member when angled inwardly or outwardly relative to the axis 152, depending upon the particular application.

Figure 8:
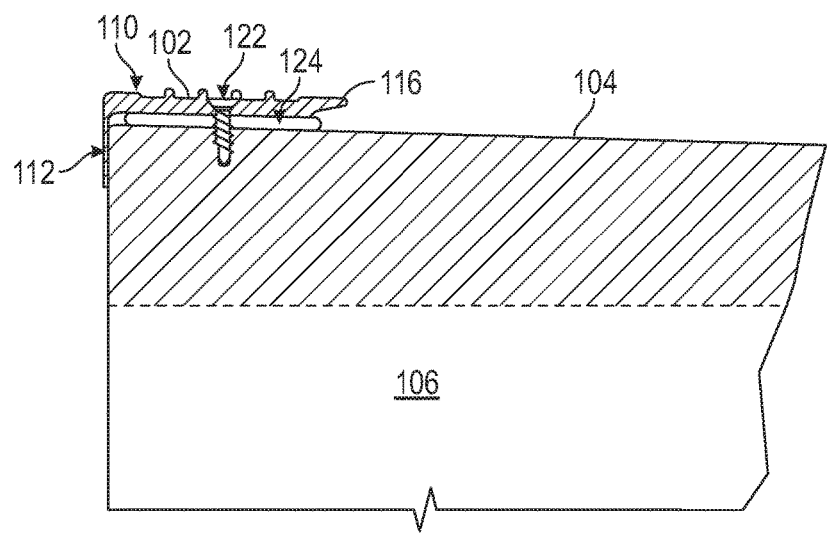
FIG. 8 is a side elevation view illustrating the mounting member of FIG. 5 mounted to a slide-room.
Figure 9:
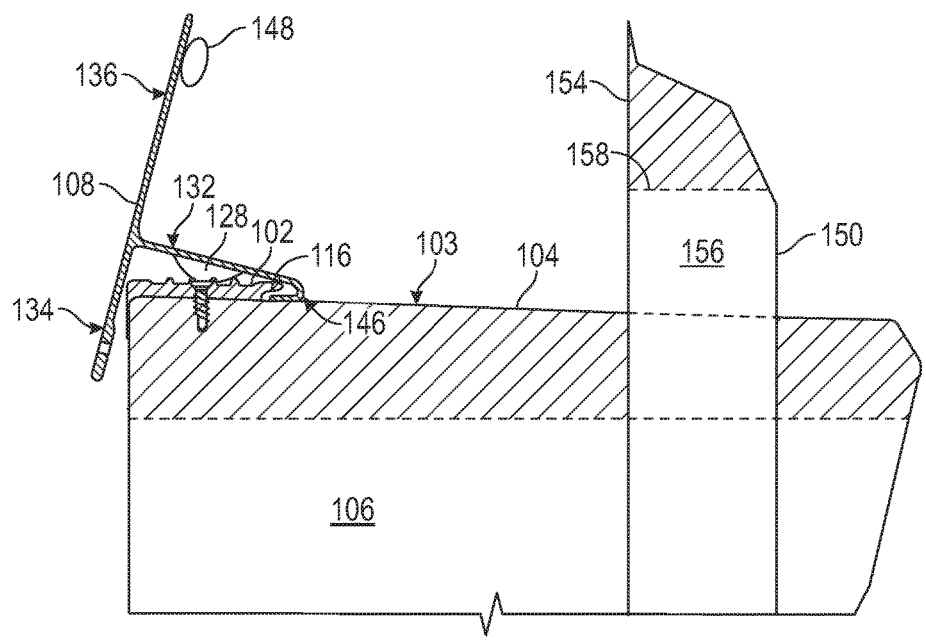
FIG. 9 is a side elevation view illustrating attachment of the flange member of FIGS. 6 and 7 to the mounting member.

FIGS. 8 and 9 illustrate installation of the flange assembly 100. First, the base member 102 is installed on the roof 104 of the slide-room 106. Installation of the base member 102 can be performed before the slide-room is installed in the vehicle. After the slide-room is installed in the vehicle, the flange member 108 can be coupled to the base member 102, as shown in FIG. 9. By rotating the flange member 108 relative to the base member 102, the hook portion 146 of the coupling portion 132 can engage the lip portion 116 of the base member. Because only a small angular displacement is required to engage the lip portion 116 with the hook portion 146, the flange member 108 can be installed after the slide-room is received in the vehicle, in spite of the narrow clearance between the roof of the slide-room and the wall of the vehicle.

Figure 10:
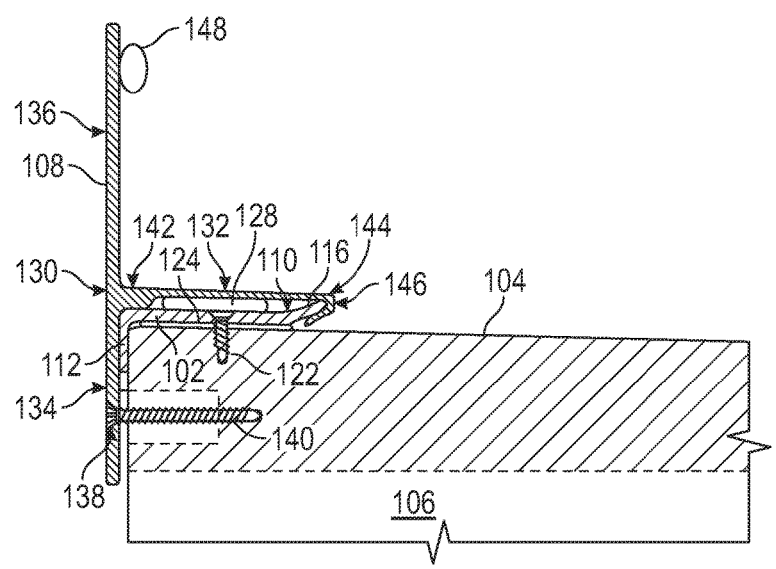
FIG. 10 is a side elevation view of an alternative embodiment of a flange assembly mounted to a slide-room.

FIG. 10 illustrates another embodiment of the flange assembly 100 in which the first end portion 142 of the coupling portion 132 is thicker than the remainder of the coupling portion, and the coupling portion is shaped to provide a recess in which the seal 128 can be received. The lip portion 116 of the base member can also be angled upwardly with respect to the surface of the main portion 110 to facilitate engagement with the hook portion 146 of the coupling portion.

The base member 102 and/or the flange member 108 can be made from a variety of materials such as, for example, metals such as aluminum or steel, or polymeric materials such as vinyl, polyesters, ultra-high molecular weight (UHMW) polyethylene, acrylonitrile butadiene styrene (ABS), or polyethylene terephthalate (PET) to name a few. The seal members 124, 128, 148 can be made from, for example, rubber, any of various synthetic elastomers, foam, caulking, putty (such as putty tape), etc. In some embodiments, the seal member 148 can be a bulb seal.

The flange assemblies described herein can also be applied to other surfaces of the slide-room in addition to the roof. For example, flange assemblies comprising respective base members and flange members can be coupled to the outer surfaces of the side walls of the slide-room. Thus, the respective sealing portions of the flange members can extend beyond the outer surfaces of the slide-room walls and engage the interior side surfaces of the vehicle wall adjacent the opening. A flange assembly can also be coupled to the lower exterior surface of the slide-room opposite the roof (e.g., to a floor panel of the slide-room). In this manner, the flange members of the respective assemblies can stabilize the slide-room and seal the space between the vehicle and the slide-room around the entire perimeter of the slide-room opening. In other embodiments, any combination of the roof, the sides, and/or the lower surface of the slide-room can include a flange assembly coupled thereto.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A", "B,", "C", "A and B", "A and C", "B and C", or "A, B, and C."

As used herein, the term "coupled" generally means physically coupled or linked and does not exclude the presence of intermediate elements between the coupled items absent specific contrary language.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, molecular weights, percentages, angles, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims.

The invention claimed is:

1. An assembly for sealing a space between a secondary structure movable into and out of an opening in a wall of a primary structure between an extended position and a retracted position, comprising:
   a base member mountable to an outer surface of the secondary structure, the base member including a main portion and an extension portion perpendicular to the main portion, the main portion comprising a lip portion, the extension portion extending downwardly from an edge of the main portion opposite the lip portion such that the base member has an L-shaped cross-section;
   a flange member including a main flange portion and a coupling portion extending from the main flange portion, the main flange portion including a first portion and a second portion, the second portion being on the opposite side of the coupling portion from the first portion, the coupling portion being couplable to the base member such that the first portion is adjacent a rear wall of the secondary structure and the second portion extends beyond the outer surface of the secondary structure when the coupling portion is coupled to the base member;
   wherein the second portion of the main flange portion is configured to engage an interior surface of the wall of the primary structure when the secondary structure is in the extended position; and
   wherein the coupling portion of the flange member includes a hook portion configured to engage the lip portion of the base member.

2. The assembly of claim 1, wherein:
   the lip portion extends lengthwise along the base member and forms an edge of the main portion opposite the extension portion.

3. The assembly of claim 2, wherein the extension portion of the base member is configured to be disposed between the first portion of the main flange portion and the rear wall of the secondary structure when the base member is mounted to the secondary structure and the flange member is coupled to the base member.

4. The assembly of claim 2, wherein the main portion of the base member includes a plurality of ridges extending lengthwise along the main portion.

5. The assembly of claim 1, wherein the second portion of the main flange portion further comprises a sealing member configured to engage the interior surface of the wall of the primary structure when the secondary structure is in the extended position.

6. An assembly for sealing a space between a secondary structure movable into and out of an opening in a wall of a primary structure between an extended position and a retracted position, comprising:
   a base member mountable to an outer surface of the secondary structure;
   a flange member including a main flange portion and a coupling portion extending from the main flange portion, the main flange portion including a first portion and a second portion, the second portion being on the opposite side of the coupling portion from the first portion, the coupling portion being couplable to the base member such that the first portion is adjacent a rear wall of the secondary structure and the second portion extends beyond the outer surface of the secondary structure when the coupling portion is coupled to the base member; and
   wherein the second portion of the main flange portion is configured to engage an interior surface of the wall of the primary structure when the secondary structure is in the extended position; and
   wherein the assembly further comprises a seal member disposed between the base member and the coupling portion of the flange member.

7. The assembly of claim 6, wherein the coupling portion of the flange member includes a first end portion coupled to the main flange portion and a second end portion opposite the first end portion, the first end portion being thicker than the second end portion such that the coupling portion defines a recess to receive the seal member between the base member and the coupling portion.

8. The assembly of claim 1, wherein the second portion of the main flange portion defines an angle of 5 degrees to 10 degrees with respect to a vertical axis defined by the rear wall of the secondary structure when the base member is mounted to the outer surface of the secondary structure and the coupling portion of the flange member is coupled to the base member.

9. The assembly of claim 1, wherein the coupling portion of the flange member is perpendicular to the main flange portion such that the flange member has a T-shaped cross-section.

10. An assembly for sealing a space between a secondary structure movable into and out of an opening in a wall of a primary structure between an extended position and a retracted position, comprising:
    a base member mountable to an outer surface of the secondary structure;
    a flange member including a main flange portion and a coupling portion extending from the main flange portion, the main flange portion including a first portion and a second portion, the second portion being on the opposite side of the coupling portion from the first portion, the coupling portion being couplable to the base member such that the first portion is adjacent a rear wall of the secondary structure and the second portion extends beyond the outer surface of the secondary structure when the coupling portion is coupled to the base member; and
    wherein the second portion of the main flange portion is configured to engage an interior surface of the wall of the primary structure when the secondary structure is in the extended position;
    wherein the first portion of the main flange portion defines one or more openings configured to receive fasteners oriented parallel to the outer surface of the secondary structure; and
    wherein the base member defines one or more openings configured to receive fasteners oriented perpendicular to the outer surface of the secondary structure.

11. The assembly of claim 1, wherein the assembly is configured to be mountable to a secondary structure configured as a slide-room that is movable into and out of a primary structure configured as a vehicle.

12. The assembly of claim 11, wherein when the assembly is mounted to the slide room, the outer surface of the secondary structure is an upper surface of the slide-room.

13. A method, comprising:
    mounting a base member on an outer surface of a secondary structure;
    installing the secondary structure in an opening defined in a wall of a primary structure such that the secondary structure is movable through the opening between an extended position and a retracted position; and
    coupling a flange member to the base member with a coupling portion of the flange member, the flange member including a main flange portion from which the coupling portion extends, the main flange portion further including a first portion and a second portion, the second portion being on the opposite side of the coupling portion from the first portion;
    wherein the flange member is coupled to the base member such that the first portion of the main flange portion is adjacent a rear wall of the secondary structure, and such that the second portion of the main flange portion extends beyond the outer surface of the secondary structure.

14. The method of claim 13, wherein coupling the flange member to the base member further comprises engaging a lip portion of the base member with a hook portion of the coupling portion.

15. The method of claim 13, wherein coupling the flange member to the base member further comprises compressing a seal member between the coupling portion of the flange member and the base member.

16. The method of claim 13, further comprising securing the first portion of the main flange portion to the rear wall of the secondary structure.

17. The method of claim 13, wherein:
    mounting the base member further comprises mounting the base member such that an extension portion of the base member is situated adjacent the rear wall of the secondary structure; and
    coupling the flange member to the base member further comprises coupling the flange member to the base member such that the first portion of the main flange portion at least partially overlaps the extension portion of the base member.

18. The method of claim 13, further comprising moving the secondary structure to the extended position such that the second portion of the main flange portion contacts an interior surface of the wall of the primary structure.

19. The method of claim 13, wherein the primary structure comprises a vehicle and the secondary structure comprises a slide-room.

20. The method of claim 19, wherein the act of coupling the flange member to the base member occurs after installing the slide-room in the vehicle.

21. A vehicle, comprising:
   a vehicle wall having an opening;
   a slide-room mounted within the opening and being moveable relative to the wall between an extended position and a retracted position; and
   a flange assembly for sealing a space between the slide-room and the wall, the flange assembly comprising:
      a base member mountable to an outer surface of the slide-room;
      a flange member including a main flange portion and a coupling portion extending from the main flange portion, the main flange portion including a first portion and a second portion, the second portion being on the opposite side of the coupling portion from the first portion, the coupling portion being coupled to the base member such that the first portion is adjacent a rear wall of the slide-room and the second portion extends beyond the outer surface of the slide-room; and
      wherein the second portion of the main flange portion is configured to engage an interior surface of the wall of the vehicle when the slide-room is in the extended position.

* * * * *